United States Patent [19]
Alger

[11] 3,824,479
[45] July 16, 1974

[54] CONTROLLER WITH DIGITAL INTEGRATION

[75] Inventor: Trygve O. Alger, Norwalk, Conn.

[73] Assignee: Harrel, Incorporated, East Norwalk, Conn.

[22] Filed: Aug. 16, 1972

[21] Appl. No.: 280,988

[52] U.S. Cl. .......... 328/69, 235/92 CT, 235/92 NT, 235/150.1, 307/229, 328/1, 328/127

[51] Int. Cl. .......... H03k 17/00

[58] Field of Search .......... 328/1, 69, 127, 151; 307/229; 219/494–510; 330/1 A, 9; 235/150.1 FB, 92 MP, 92 CT, 92 NT; 318/609, 610

[56] References Cited

UNITED STATES PATENTS

| | | | |
|---|---|---|---|
| 2,867,724 | 1/1959 | Olson | 328/69 |
| 3,148,366 | 9/1964 | Schulz | 340/347 CC |
| 3,201,781 | 8/1965 | Holland | 340/347 |
| 3,521,269 | 7/1970 | Brooks et al. | 340/347 |
| 3,529,180 | 9/1970 | Micheli | 328/127 X |
| 3,582,796 | 6/1971 | Shifflet, Jr. et al. | 328/69 |
| 3,589,457 | 6/1971 | Joos | 340/347 AD |

*Primary Examiner*—Stanley D. Miller, Jr.
*Attorney, Agent, or Firm*—Buckles and Bramblett

[57] ABSTRACT

A controller for use in automatic control applications such as temperature controllers, where a proportional plus automatic reset (integral compensation) or a combination of proportional plus automatic reset and rate (derivative compensation) are applicable. A control characteristic similar to conventional proportional plus automatic reset plus rate control is obtained by use of an up/down digital counter controlled by an oscillator whose frequency is controlled by the error signal. Such a control exhibits the general control characteristics of a proportional plus automatic reset controller in elimination of temperature "droop" but requires little or no adjustment to match the requirements of varying loads. Further elimination of the need for manual adjustment of rate, reset, and proportional band to match differing loads can be had by shaping the frequency characteristic of the oscillator to a non-linear function of the error signal.

The foregoing abstract is not to be taken either as a complete exposition or as a limitation of the present invention. In order to understand the full nature and extent of the technical disclosure of this application, reference must be had to the following detailed description and the accompanying drawings as well as to the claims.

14 Claims, 5 Drawing Figures

CONTROLLER WITH DIGITAL INTEGRATION

BACKGROUND OF THE INVENTION

This invention pertains to closed loop automatic controls generally and is disclosed specifically in connection with temperature controllers for plastics machinery.

It is well known in the plastics industry to employ temperature controllers having a combination of three types of control characteristics — namely, proportional, automatic reset, and rate control. These features are disclosed in two published articles of H. E. Harris. One, entitled "Fundamental Analysis of Extruder Temperature Control," appeared in the August 1967 issue of *Modern Plastics* magazine and disclosed the combination of proportional plus automatic reset control. The second, entitled "Temperature Controllers for Plastics Machinery," appeared in the April 1970 issue of *Plastics Design and Processing* and disclosed the three element combination of proportional, plus automatic reset, plus rate control characteristics.

In a simple proportional controller, all control functions take place within a "proportional band" centered about the desired or "set point" temperature. Within this band, the controller simply senses the magnitude of the error signal and drives the controller to reduce the error toward zero. As the output is a function of the error signal, the actual temperature can never equal the set point temperature (that is, the error can never be zero) because there would then be no output. Accordingly, in a simple proportional controller there will always be a temperature error or "droop." The droop can be eliminated by adding an integrating or "automatic reset" term. This is usually accomplished by an integrating circuit comprising an RC network employed as a feedback element around a high gain amplifier. This is quite effective in eliminating the droop, but the combination responds very slowly to any transient changes. However, as pointed out in the above-mentioned publications, this problem may be overcome by adding a third term which is proportional to the rate of change of the error signal.

While the foregoing approach results in theoretically good control, certain practical difficulties present themselves. For example, when used to control the temperature of a rather massive heat sink, such as a plastic extruder, the RC network integrator described above actually introduces an additional transient error. Such an extruder may require as much as half an hour to an hour or more to come from room temperature to its operating temperature, which may be in the neighborhood of 400°. During this time the output maximum is determined by the power line voltage. Over this period the capacitor used for automatic reset as noted above will become fully charged to the supply voltage and will thereupon cease any further integration, allowing the amplifier to go to its full gain. When the temperature reaches the set point, the output from the temperature sensing bridge reverses in polarity and the signal attempts to drive the output down. However, current now flows out of the capacitor, opposing the change from the bridge and hence the change in output. The result is that the temperature overshoots much more than it would with a simple proportional controller and it takes much longer to settle back down. This is called "reset wind-up."

Another problem results from the fact that the characteristics of the controller must be adjusted to match the characteristics of the load. For a heating-only controller, three such adjustments must be made. First the gain of the proportional band amplifier must be adjusted. If set too high, the control loop will become unstable and, if set too low, system response will be poorer than desired. Secondly, the reset or integral term has the dimensions of both magnitude and time. If the reset time is set too low, the system will become oscillatory, but if set too long, the system will be sluggish. Third, the rate term also has dimensions of magnitude and time. If the rate time constant is too long, and the magnitude too high, the rate will overpower the reset and cause system instability. On the other hand, if the rate time constant is too short and the magnitude too small, its effect will be negligible.

Accordingly, in a heating-only controller, three manual adjustments must be made in order that the controller characteristics match the load. If, as in the case with much plastics machinery, both heating and cooling are being controlled, six such adjustments must be made. As a result, in actual practice controllers typically operate with far from optimum adjustments.

BRIEF DESCRIPTION OF THE DRAWINGS

The invention may be best understood by reference to the following description, the appended claims, and the figures of the attached drawings wherein:

DESCRIPTION OF THE PREFERRED EMBODIMENTS

Figure 1:
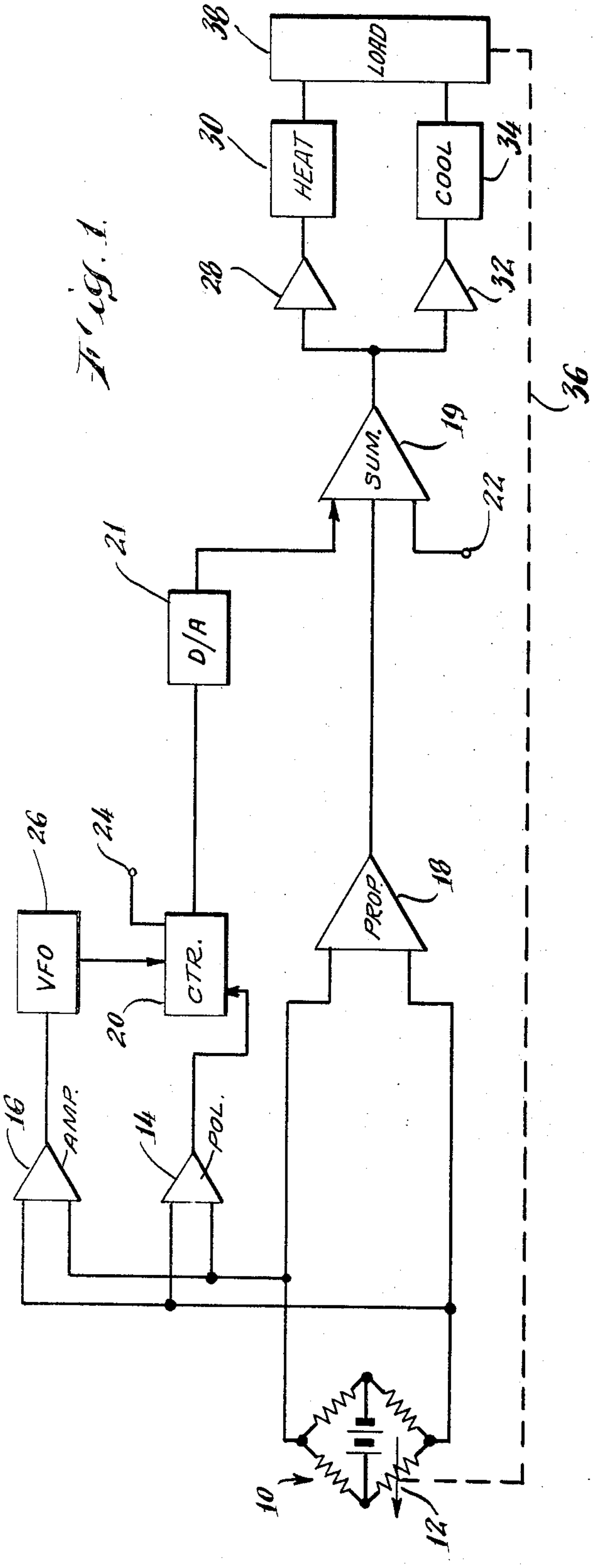
FIG. 1 is a schematic diagram of a controller in accordance with this invention.

With reference to FIG. 1, there is illustrated a closed loop control system for both heating and cooling. It comprises a Wheatstone bridge 10 having a sensing element 12, which may be, for example, in the barrel of a plastic extruder. The output of this bridge 10 will be proportional to the error signal, or difference between the desired temperature, and the actual temperature. The output will be one polarity if the temperature is too high and the other polarity if it is too low.

The output of bridge 10 is supplied to a polarity sensing amplifier 14 and to an oscillator amplifier 16, and through a proportional band amplifier 18 to a summing amplifier 19. The polarity sensing amplifier 14 senses the polarity of the error signal produced by bridge 10 and controls the up/down line of an up/down digital counter 20. The up/down counter 20 supplies a digital-to-analog converter 21. The output of the digital-to-analog converter 21 is supplied to summing amplifier 19 where it is summed with the signal supplied from the bridge 10 through proportional amplifier 18. In one embodiment, the up/down counter 20 is an 8 bit binary device, which gives 256 possible counts, but it can be of greater or smaller range depending on the stability and resolution required in the control of temperature. The output of the D/A converter 21 is zero to 10 volts for counts from 0 to 256. The output range of the summing amplifier 19 is plus or minus 10 volts, which is the magnitude required to operate the heat and cool power stages from zero to 100 percent output. The gain of the amplifier 19 is such that a 5 volts signal on any of the three input lines will result in a $\pm$ 10 volts output signal. The output of the proportional amplifier is $\pm$ 5 volts maximum, for a range of temperature (proportional band) determined by the gain of the amplifier. A bias voltage of $-5$ volts is injected at terminal 22 so that the output of the summing amplifier is zero when the output of bridge 10 is zero and the output of the up/down counter 20 is at 50 percent of full count. This is done to create a signal of plus or minus 5 volts when the output of the counter goes from 0 count to maximum count. An appropriate input on a reset terminal 24 can set the up/down counter 20 to half maximum count. A reset signal is supplied at terminal 24 whenever power is initially applied to ensure that the counter always starts counting from its half count condition.

The input to the up/down counter is supplied by a variable frequency oscillator 26 controlled by the bridge amplifier 16. The oscillation frequency of the variable frequency oscillator 26 is proportional to the magnitude of the error signal from the bridge 10.

The final output from summing amplifier 19 is supplied to a heating amplifier 28 which controls a heating device 30. It also is supplied to a cooling amplifier 32 which controls a cooling device 34. These may be of any type well known to the art. The control loop is closed by the thermal path 36 between the load 38 and the sensing element 12.

When power is first applied to the control circuit, the reset terminal 24 is activated, and the up/down counter 20 is set to 50 percent of maximum count. The output of the digital-to-analog converter 21 is exactly equal and opposite to the bias 22 at this point, so the output from the digital counting circuit 20 initially contributes nothing to the resulting control signal. At this initial instant the control signal output from summing amplifier 19 will be directly proportional to the output of the proportional amplifier 18 and hence also directly proportional to the error from bridge 10.

If the digital counting circuit and bias were not present, the combination of bridge 10, proportional amplifier 18, summing amplifier 19, and heating and cooling components 28, 30, 32, 34 would constitute a conventional proportional controller, and if the gain of the various amplifiers were properly adjusted, the temperature would eventually settle out to a steady value. This eventual temperature would not, however, be equal to the set point temperature. For if the actual and set point temperatures were the same, there would be no output from the bridge 10 and hence no output from the proportional amplifier 18. In order for an output to exist there must be a temperature error, or "droop."

The digital counting circuit described here operates to eliminate this "droop." Suppose, for example, that the actual temperature is *below* the desired set point. The polarity amplifier 14 will sense the polarity of the sensing bridge 10 and switch the up/down line of counter 20 to up. While the output signal from bridge 10 is large, the oscillator amplifier 16 will cause the variable frequency oscillator 26 to emit relatively high frequency pulses to up/down counter 20. These pulses will cause the count in the up/down counter 20 to increase relatively rapidly from the initial mid-count status. As the count increases, the signal from the digital-to-analog converter 21 also increases, and thus is no longer equal and opposite to the bias 22, which just balanced out the mid-count value. The output from the summing amplifier 19 will thus increase rapidly and will increase the heat to the load.

As the temperature in the load approaches the set point, the output of bridge 10 will decrease, and the frequency of the variable frequency oscillator 26 will likewise decrease. The heat output will thus rise more slowly. When the actual temperature reaches the set point temperature, the output of bridge 10 is zero; the VFO 26 frequency is zero (VFO 26 stops); the counter 20 stops increasing, and the heat stops increasing.

If the actual temperature becomes too high, the output from bridge 10 will reverse in polarity. The polarity amplifier 14 will change the up/down line of counter 20 to down, and the counter will start counting down at a rate proportional to the error signal. The heat output will decrease, and if necessary, the output will shift to cooling.

It is clear from the above discussion that an equilibrium position will be reached at the point where the actual temperature just equals the set point temperature. This is the only point where the up/down line switches from up to down or vice versa. It is also the point where the output frequency of the VFO 26 is zero, so that the counter 20 is not increasing or decreasing the signal from the digital-to-analog converter 21 to make corrections in heating or cooling output.

Actual tests of the above described control circuit have shown that it exhibits the general control characteristics of a proportional plus automatic reset controller in that it eliminates all of the temperature "droop" associated with simple proportional controllers. It does, however, require much less adjustment than a conventional proportional plus automatic reset or proportional plus automatic reset plus rate controller.

With conventional controllers, as already noted, very close adjustment must be made of proportional band, reset time, and rate to match the characteristics of the controller to the load. If such adjustments are not made, and the controller is used with a variety of different loads, the control characteristic will vary from oscillator (for those where the proportional band and reset time are set too low or the rate too high) to very, very sluggish in response (for those where proportional band and reset time are set too high or rate too low).

The controller described in the present invention can give quite satisfactory results over a wide range of load characteristics with no adjustment at all. It thus becomes entirely feasible to manufacture a controller with no external trimmer adjustments which can give excellent performance with any reasonable load characteristic which is likely to be encountered in practice.

Experiments have also shown that with some general classes of loads, even further improvements in performance can be had over a wide range of load characteristics without requiring individual trimming of controller characteristics, by creating a non-linear relationship between frequency of the variable frequency oscillator 26 and the error signal output from the bridge 10. In some cases, for example, it has been found desirable to shape this characteristic so that the VFO 26 has a dead zone, or zero output for error signals corresponding to approximately 1 percent of the proportional band (i.e., the band of temperatures where the proportional amplifier is within its ± 5 volt linear range); then a square law characteristic for error signals corresponding to temperatures of 1 to 10 percent of the proportional band; and a linear characteristic above that. Such an amplifier shows faster response for substantial errors but still has the slow time constants required for stability once the temperature gets close to the set point.

Figures 2, 4:
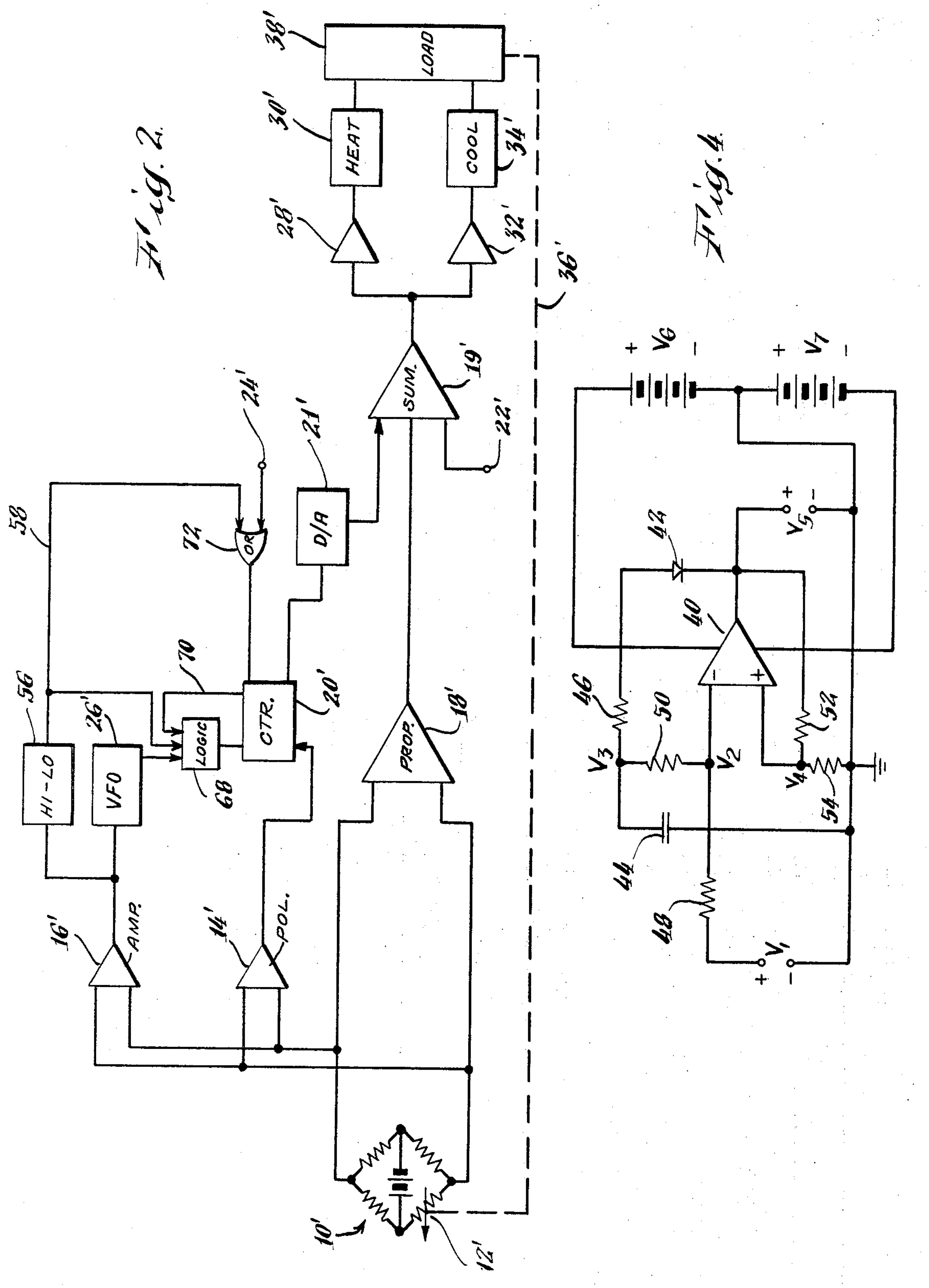
FIG. 2 is a schematic diagram of another version of the controller of FIG. 1.
FIG. 4 is a circuit diagram of a voltage controlled oscillator usable in the circuits of FIGS. 1 and 2.

The circuit of FIG. 4 shows a variable frequency oscillator usable in this invention whose output frequency is controlled by the input voltage. The circuit uses a switching comparator 40 having the following characteristics:

When $V_2$ is more positive than $V_4$, the output $V_5$ goes to a large negative value, which may be determined by the power supply voltage $V_7$, or by clipping within the comparator 40;

When $V_4$ is more positive than $V_2$, the output $V_5$ goes to a large positive value, which may be determined by the power supply voltage $V_6$ or by clipping within comparator 40.

In operation, when the output voltage $V_5$ is negative, diode 42 conducts, allowing capacitor 44 to charge in a negative direction through resistor 46. A positive input voltage $V_1$ can be used to retard the rate at which capacitor 44 charges by drawing off some of the charging current through resistors 48 and 50. Resistors 52 and 54 form a voltage divider and define voltage $V_4$ as a fraction of the output voltage $V_5$. When the capacitor 44 has charged to such an extent that voltage $V_2$ is more negative than $V_4$, the output voltage $V_5$ goes positive, causing diode 42 to go into its nonconducting state. Capacitor 44 now discharges through resistors 48 and 50. The rate of discharge is controlled by the input voltage $V_1$. The voltage $V_3$ on capacitor 44 goes to zero and it begins to charge in the positive direction. When the capacitor has charged to such an extent that $V_2$ is more positive than $V_4$, the output goes negative and the cycle repeats. Note that, if the input voltage $V_1$ is not larger than $V_4$, the above condition cannot be met and the circuit will not oscillate. When the circuit is oscillating, the output $V_5$ consists of a square wave whose frequency and duty cycle are determined by the input voltage $V_1$ and by the values of the various circuit elements.

The effect of the input voltage on the output frequency and duty cycle may be adjusted greatly by the appropriate choice of component values. The ratio of resistors 52 and 54 determines, in part, the amplitude of the voltage $V_4$. The cutoff value of $V_1$, below which the circuit stops oscillating, is similarly controlled. Resistor 52 is typically made much larger than resistor 54 to accomodate a wider range of input voltage $V_1$ and to reduce the voltage excursions required on capacitor 44.

The time constant during charging is primarily governed by values of the capacitor 44 and the resistors 46, 48, and 50. If resistor 48 has much higher resistance than resistor 46, then the charging time will be largely independent of the input voltage $V_1$. If, on the other hand, the value of resistor 48 is comparable to, or less than, that of resistor 46, the charging time will increase with increasingly positive input voltage $V_1$.

The time constant during discharge is governed by the values of capacitor 44, resistors 48 and 50, and the input voltage $V_1$. For most values of resistors 48 and 50, the discharge time decreases for increasingly positive input voltage $V_1$.

What makes this oscillator different from any known standard circuit is the presence of diode 42. This isolates the charging circuit from the discharging circuit to vary the charge and discharging time constants as well as the duty cycle.

Figure 3:
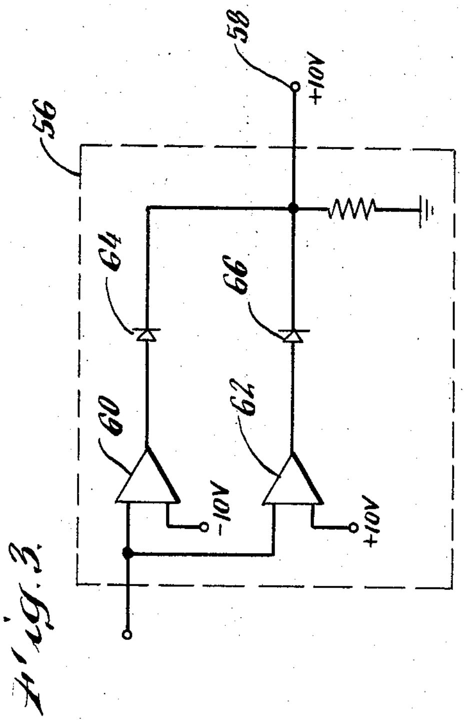
FIG. 3 is a circuit diagram of the overrange subcircuit employed in the circuit of FIG. 2.

It is apparent that the performance which has been described here can be obtained only within the linear range of the up/down counter 20. When enough counts have been put into the counter to run it either to maximum or zero, no further correction will occur. To handle these limiting cases, certain additional features are added to the controller circuit, as shown in FIG. 2. In FIG. 2, elements similar to those of FIG. 1 have been given similar reference numerals with a prime (') attached. To the circuit of FIG. 1, has now been added an overrange, or hi-low limit circuit 56. This circuit has preset limits of plus or minus 10 volts. Plus 10 volts corresponds to an error signal from bridge 10' equivalent to the upper limit of the proportional band, and −10 volts to the lower limit of the proportional band. When either a high or low limit is reached, an output signal is generated at its output 58. The overrange circuit is shown in more detail in FIG. 3. It comprises summing amplifiers 60, 62 with their outputs connected to suitable diodes 64, 66. A +10 volt bias is applied to the negative terminal of amplifier 62 and a negative 10 V bias is applied to the positive terminal of amplifier 60. When the input signal exceeds +10 volts, the amplifier 60 will generate a positive output. Similarly, when the input signal exceeds −10 volts, amplifier 62 will have a positive output.

The output 58 of the hi-low limit circuit 56 is now passed into a logic circuit 68, along with the output from the VFO 26' and a carry line 70 from the up/down counter 20'. The effect of this logic circuit is to stop further counts either when the high or the low limit has been exceeded or when the carry line 70 is energized. Since the limit of the high low limit circuit is normally set to be the same as the limits of whatever proportional band is being used, as determined by the gain of proportional amplifier 18', this means that no counting will take place and the digital circuit will be inactive whenever the controller is operating outside its proportional band.

The carry line 70 from the up/down counter 20' is activated whenever the counter either counts up to maximum or when it counts down to zero. This output is also fed into the logic circuit 68 to stop the count whenever the counter has counted to either end of its range. This prevents the counter from going beyond full count in either direction.

The output of the hi-low limit circuit 56 is also fed into one input of an OR circuit 72. This causes the counter to be reset to half of maximum count whenever the limit circuit 56 reaches its limit. It will be recalled that half maximum count just balances the negative bias at 22' and leaves only the proportional amplifier 18' influencing the output. The effect of the hi/lo circuit, therefore, is to inhibit all effect of the digital circuit whenever the actual temperature is outside of the proportional band and to ensure that the digital circuit starts from its effective zero when the temperature moves into the proportional band either on warm-up or cool down. The power reset terminal 24' input to the OR circuit 72 similarly ensures that the digital circuit is set to zero whenever the power is first turned on.

Figure 5:
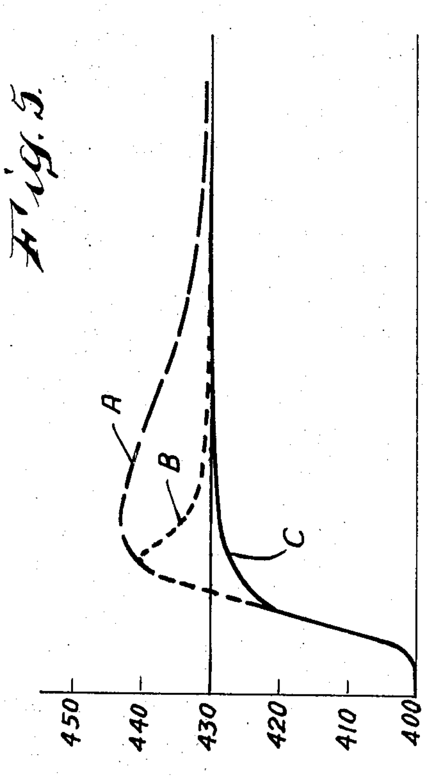
FIG. 5 is a graph helpful in explaining the operation of the invention.

The operation of the invention may be better understood by reference to FIG. 5. This illustrates performance of standard proportional plus automatic reset controllers and a controller embodying the present invention if the control is initially operating at 400° and the set point is suddenly changed to 430°. Curve A represents a conventional proportional plus automatic reset plus rate controller adjusted for a long reset time. As can be seen, the operation is very sluggish. Temperature overshoots many degrees, and takes a long time to come back down. Curve B is the same controller with reset time adjusted to the minimum which will allow stability for this load. The controller still overshoots, but not nearly so far, and operation is much more rapid. Curve C represents a controller with one form of variable reset according to the teaching of the present invention. The reset time is quite fast for large temperature deviations. As the temperature approaches the set point, however, the recovery rate slows down to correspond to the conventional controller with long reset time. In other words, the controller will overcome large temperature errors faster than a properly adjusted conventional controller. It will take longer than a properly adjusted conventional controller to eliminate the last degree or so of error, but there are a great many practical applications where getting within a degree or so rapidly is of primary importance.

It will be apparent to those skilled in the art that a number of variations and modifications may be made in this invention without departing from its spirit and scope. Accordingly, the foregoing description is to be construed as illustrative only, rather than limiting. This invention is limited only by the scope of the following claims.

I claim:

1. A circuit for achieving and maintaining a preselected energy level in a load which comprises: means for sensing the energy level of said load and generating an error signal proportional to the difference between the sensed and the preselected energy levels; a proportional band amplifier responsive to said error signal to produce a first analog signal proportional thereto; means responsive to said error signal for producing a pulsed output, the frequency of said pulses being a function of the magnitude of said error signal; means for receiving and storing said pulses in digital form; means responsive to the content of said receiving and storing means for generating a second analog signal having an amplitude which is a function of the number of stored pulses; means responsive to the polarity of said error signal for increasing the number of stored pulses if the error is of one polarity and decreasing the number of stored pulses if the error is of the other polarity; and means responsive to both of said first and second analog signals for adjusting the flow of energy to said load relative thereto.

2. The circuit of claim 1 wherein said pulsed output producing means comprises: a variable frequency oscillator having an output frequency which is a non-linear function of the magnitude of said error signal.

3. The circuit of claim 2 wherein said pulsed output producing means comprises: means for inactivating said receiving and storing means when said error signal reaches a preselected magnitude.

4. The circuit of claim 3 wherein said pulsed output producing means comprises: means for resetting said receiving and storing means when said error signal reaches said preselected magnitude.

5. The circuit of claim 1 wherein said means responsive to said first and second analog signals comprises a summing amplifier.

6. The circuit of claim 5 wherein said pulsed output producing means comprises: a variable frequency oscillator having an output frequency which is a non-linear function of the magnitude of said error signal.

7. The circuit of claim 5 wherein said error signal generating means comprises: a Wheatstone bridge connected to supply said pulsed output means and said proportional band amplifier.

8. The circuit of claim 7 wherein said pulsed output producing means comprises: a variable frequency oscillator having an output frequency which is a non-linear function of the magnitude of said error signal.

9. The circuit of claim 8 wherein said variable frequency oscillator comprises: a switching comparator whose output state is determined by the sign of the difference between its two input voltages; a resistor-capacitor network connected between the input and output of the comparator through a charging path and a discharging path; a unidirectional current device in series with one of said paths; and positive feedback means for maintaining oscillation.

10. The circuit of claim 1 wherein said pulsed output producing means comprises: means for inactivating said receiving and storing means when said error signal reaches a preselected magnitude.

11. The circuit of claim 10 wherein said preselected magnitude comprises both a high and a low magnitude.

12. The circuit of claim 10 wherein said pulsed output producing means comprises: means for resetting said receiving and storing means when said error signal reaches said preselected magnitude.

13. A circuit for achieving and maintaining a preselected energy level in a load which comprises: means for sensing the energy level of said load and generating an error signal proportional to the difference between the sensed and the preselected energy levels; a variable frequency oscillator responsive to said error signal for producing a pulsed output whose frequency is a non-linear function of the magnitude of said error signal comprising a switching comparator whose output state is determined by the sign of the difference between its two input voltages, a resistor-capacitor network connected between the input and output of the comparator through a charging path and a discharging path, a unidirectional current device in series with one of said paths, and positive feedback means for maintaining oscillation; means for receiving and storing said pulses in digital form; means responsive to the content of said receiving and storing means for generating an analog control signal having an amplitude which is a function of the number of stored pulses; means responsive to the polarity of said error signal for increasing the number of stored pulses if the error is of one polarity and decreasing the number of stored pulses if the error is of the other polarity; and means responsive to said control signal for adjusting the flow of energy to said load relative thereto.

14. A circuit for achieving and maintaining a preselected energy level in a load which comprises: means for sensing the energy level of said load and generating an error signal proportional to the difference between the sensed and the preselected energy levels; a variable frequency oscillator responsive to said error signal for producing a pulsed output having a frequency which is a non-linear function of the magnitude of said error signal comprising a switching comparator whose output state is determined by the sign of the difference between its two input voltages, a resistor-capacitor network connected between the input and output of the comparator through a charging path and a discharging path, a unidirectional current device in series with one of said paths, and positive feedback means for maintaining oscillation; means for receiving and storing said pulses in digital form; means responsive to the content of said receiving and storing means for generating an analog control signal having an amplitude which is a function of the number of stored pulses; means responsive to the polarity of said error signal for increasing the number of stored pulses if the error is of one polarity and decreasing the number of stored pulses if the error is of the other polarity; and a summing amplifier receiving both said control signal and said error signal for adjusting the flow of energy to said load relative thereto.

* * * * *